US012118108B2

(12) United States Patent
Song

(10) Patent No.: US 12,118,108 B2
(45) Date of Patent: Oct. 15, 2024

(54) BUSINESS OFFICIAL EMAIL BOX BASED B2B SERVICE SECURITY VERIFICATION METHOD, APPARATUS, AND SERVER

(71) Applicant: SHENZHEN SEKORM COMPONENT NETWORK CO., LTD, Shenzhen (CN)

(72) Inventor: Zilin Song, Shenzhen (CN)

(73) Assignee: SHENZHEN SEKORM COMPONENT NETWORK CO., LTD, Shenzhen (CN)

( * ) Notice: Subject to any disclaimer, the term of this patent is extended or adjusted under 35 U.S.C. 154(b) by 434 days.

(21) Appl. No.: 17/528,204

(22) Filed: Nov. 17, 2021

(65) Prior Publication Data

US 2022/0156397 A1    May 19, 2022

(30) Foreign Application Priority Data

Nov. 17, 2020  (CN) .......................... 202011284394.X

(51) Int. Cl.
*G06F 21/62* (2013.01)
*G06F 21/42* (2013.01)
*H04L 51/42* (2022.01)

(52) U.S. Cl.
CPC .......... *G06F 21/6218* (2013.01); *G06F 21/42* (2013.01); *H04L 51/42* (2022.05)

(58) Field of Classification Search
CPC .... G06F 21/6218; G06F 21/42; G06F 21/445; G06F 21/46; H04L 51/42; H04L 51/04; H04L 63/0838; H04L 63/18; H04L 63/083
See application file for complete search history.

(56) References Cited

U.S. PATENT DOCUMENTS 5,684,951 A * 11/1997 Goldman ................ G06F 21/31
707/999.009

FOREIGN PATENT DOCUMENTS

CN        103093131 A  *  5/2013
CN        106790267 A  *  5/2017    ......... H04L 63/0815
(Continued)

OTHER PUBLICATIONS

Rohitash Kumar Banyal, "Multi-factor Authentication Framework for Cloud Computing", 2013, DOI 10.1109/CIMSim.2013.25, 2013 Fifth International Conference on Computational Intelligence, Modelling and Simulation, p. 105-110, 6 pages (Year: 2013).*

*Primary Examiner* — Han Yang
(74) *Attorney, Agent, or Firm* — Andrew C. Cheng

(57) ABSTRACT

A business official email box based B2B service security verification method, includes: a service platform receiving an employee account and a password inputted by a business employee, and verifying whether the employee account and the password are legal or not; if yes, transmitting a log-in verification code to a business official email box to which the employee account corresponds; the service platform receiving a verification code inputted by the business employee, and determining whether the verification code is the log-in verification code or not; and if yes, the employee account successfully logging in the service platform. The present invention uses the association between the business employee and the business official email box in order to verify the identity of the business employee by means of the business official email box, and effectively prevent a resigned employee from logging in the service platform to improve the security of the platform.

9 Claims, 4 Drawing Sheets

(56) References Cited

FOREIGN PATENT DOCUMENTS

| | | | | | |
|---|---|---|---|---|---|
| CN | 109274635 | A | * | 1/2019 | ............. H04L 51/04 |
| JP | 2004139577 | A | * | 5/2004 | |
| JP | 2004265094 | A | * | 9/2004 | |

* cited by examiner

BUSINESS OFFICIAL EMAIL BOX BASED B2B SERVICE SECURITY VERIFICATION METHOD, APPARATUS, AND SERVER

FIELD OF THE INVENTION

The present invention relates to the field of B2B service security verification, and more particularly to a business official email box based B2B service security verification method, apparatus, and server.

DESCRIPTION OF THE RELATED ART

B2B (Business-to-Business) refers to a commercial model in which exchange and transmission of data information and development of transaction activities between one business and another are made through a devoted network or the Internet. This connects an internal network of a business and products and services of the business to a client through a B2B website or a mobile client terminal, such that the client may receive better service by means of the fast response of the network to thereby prompt business development of the business.

After a company settles in a service platform, the business of the company on the service platform requires maintenance by a staff of the company. This requires the company staff be entrusted with certain authorization. However, after resignation of the company staff, there may be oversight in respect of management of log-in privilege, and this leads to the resigned employee being still able to log in the service platform, exhibiting a risk of security.

SUMMARY OF THE INVENTION

The technical issue that the present invention aims to resolve is to provide, in view of the above-described deficiency of the prior art, a business official email box based B2B service security verification method, apparatus, and server.

The technical solution that the present invention adopts to resolve the technical issue is to construct a business official email box based B2B service security verification method, which comprises:
  S1, a service platform receiving an employee account and a password inputted in a log-in interface by a business employee, and verifying whether the employee account and the password are legal or not;
  S2, if yes, transmitting a log-in verification code to a business official email box to which the employee account corresponds;
  S3, the service platform receiving a verification code that the business employee inputs in the log-in interface, and determining whether the verification code is the log-in verification code or not; and
  S4, if yes, the employee account successfully logging in the service platform.

Further, the business official email box based B2B service security verification method according to the present invention further comprises, after Step S1 and before Step S2:
  S12, if yes, determining whether a time interval by which a current log-in time is separated from a previous log-in time exceeds a first preset time period; and if yes, executing Step S2.

Further, in the business official email box based B2B service security verification method according to the present invention, determining whether the verification code is the log-in verification code or not performed in Step S3 comprises:
  determining whether the verification code is received in a second preset time period after transmitting the log-in verification code, and if yes, determining if the verification code is the log-in verification code.

Further, in the business official email box based B2B service security verification method according to the present invention, determining whether the verification code is the log-in verification code or not performed in Step S3 comprises:
  determining whether the verification code is received in a second preset time period after transmitting the log-in verification code, and if no, failing to log-in the service platform.

Further, the business official email box based B2B service security verification method according to the present invention further comprises, after Step S4:
  S5, the service platform receiving an email box change request and an email box-to-be-changed-to transmitted from the business employee, the email box-to-be-changed-to being a business official email box;
  S6, the service platform transmitting a change verification code to a management account email box to which the employee account corresponds;
  S7, the service platform receiving a verification code input by the business employee, and determining whether the verification code is the change verification code or not; and
  S8, if yes, changing the business official email box of the employee account to the email box-to-be-changed-to.

Further, the business official email box based B2B service security verification method according to the present invention further comprises, after Step S5 and before Step S6:
  S56, the service platform verifying whether a business name marking location of the email box-to-be-changed-to is business name marking of the business to which the employee account belongs or not, and if yes, executing Step S6.

Further, in the business official email box based B2B service security verification method according to the present invention, Step S6 comprises:
  the service platform transmitting the change verification code and information related to the employee account to the management account email box to which the employee account corresponds.

Further, in the business official email box based B2B service security verification method according to the present invention, determining whether the verification code is the change verification code or not performed in Step S7 comprises:
  determining whether the verification code is received in a third preset time period after transmitting the change verification code, and if yes, determining whether the verification code is the change verification code or not.

Further, the business official email box based B2B service security verification method according to the present invention further comprises:
  S9, the service platform recording all historical operation information of the employee account.

Further, the present invention also provides a business official email box based B2B service security verification apparatus, which comprises:
  a first verification unit, which functions for a service platform to receive an employee account and a password inputted in a log-in interface by a business employee, and verifying whether the employee account and the password are legal or not;

a transmission unit, which functions for transmitting a log-in verification code to a business official email box to which the employee account corresponds if the employee account and the password are legal;

a second verification unit, which functions for the service platform to receive a verification code that the business employee inputs in the log-in interface, and determining whether the verification code is the log-in verification code or not; and a log-in unit, which functions such that if the verification code is the log-in verification code, then the employee account successfully logs in the service platform.

Further, the present invention further provides a server, which comprises a storage and a processor;

the storage storing a computer program; and the processor executing the computer program stored in the storage in order to perform the business official email box based B2B service security verification method described above.

The business official email box based B2B service security verification method, apparatus, and server according to the present invention provide the following beneficial efficacy. The present invention uses the association between the business employee and the business official email box in order to verify the identity of the business employee by means of the business official email box, and effectively prevent a resigned employee from logging in the service platform to improve the security of the platform.

BRIEF DESCRIPTION OF THE DRAWINGS

A detailed description of the present invention will be provided below with reference to the attached drawings and embodiments. In the drawings.

DETAILED DESCRIPTION OF PREFERRED EMBODIMENTS OF THE INVENTION

For better understanding of the technical features, purposes, and efficacy of the present invention, embodiments of the present invention will be described in detail with reference to the drawings.

Figure 1:
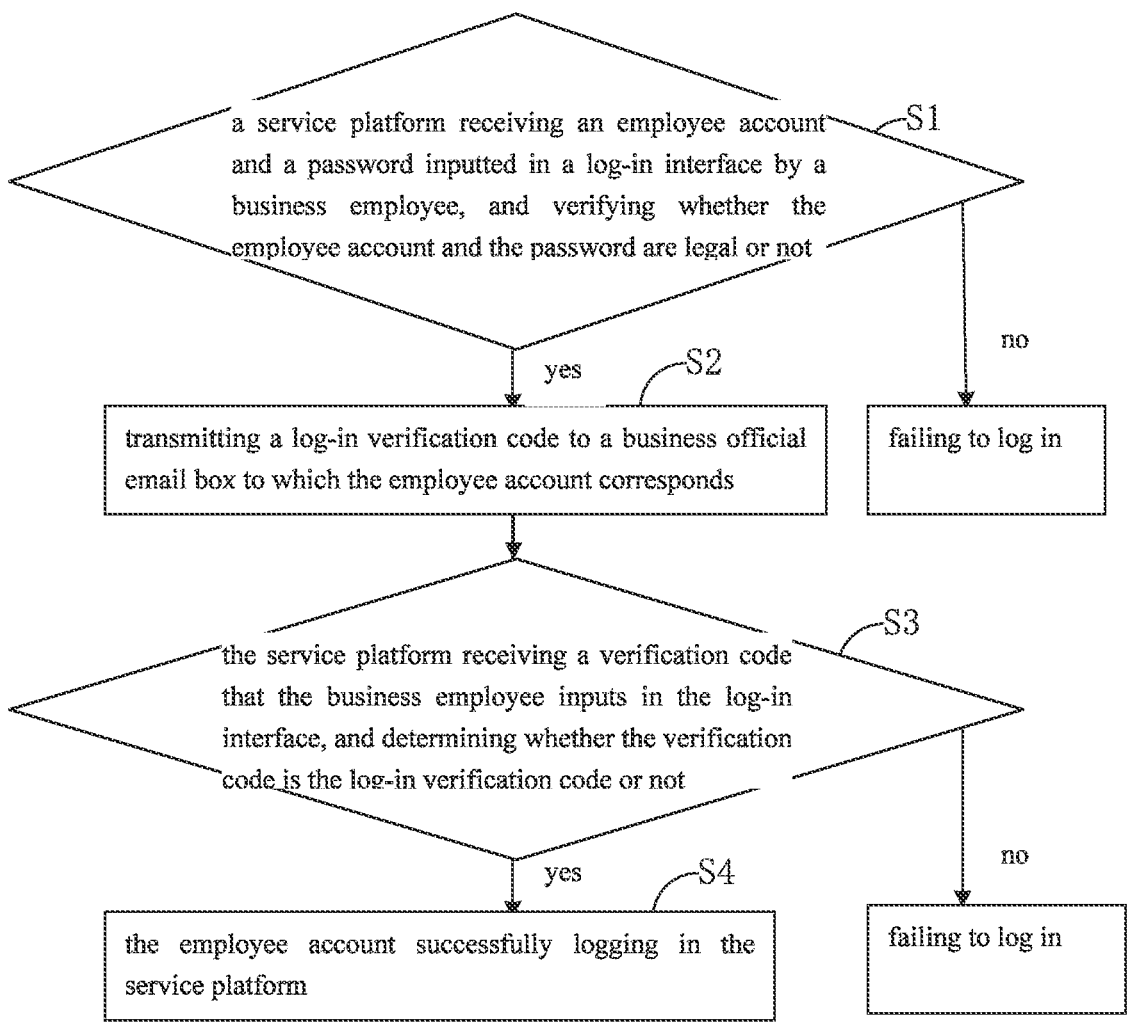
FIG. 1 is a flow chart illustrating a business official email box based B2B service security verification method provided according to an embodiment.

In a preferred embodiment, referring to FIG. 1, a business official email box based B2B service security verification method of the instant embodiment comprises the following steps:

S1, a service platform receiving an employee account and a password inputted in a log-in interface by a business employee, and verifying whether the employee account and the password are legal or not. The service platform in the instant embodiment is a platform that provides B2B service, and the service platform is executable in a server or a cloud. The service platform stores the employee account and the password registered by the business employee. The business employee may use a smart terminal, such as a computer and a smart phone, to log in the service platform. After the business employee inputs the employee account and the password in the log-in interface of the smart terminal, the smart terminal uploads the employee account and the password to the service platform, and the service platform carries out legality verification.

S2, if the employee account and the password are legal, transmitting a log-in verification code to a business official email box to which the employee account corresponds. If the employee account and the password uploaded through the smart terminal match up with the employee account and the password stored in the service platform, the user account is verified to be legal. If the employee account and the password uploaded through the smart terminal do not match up with the employee account and the password stored in the service platform, then the user account is verified to be illegal. The service platform requires each employee account be bonded to a business official email box of a business associated therewith. After the employee account and the password are verified to be legal, the service platform transmits the log-in verification code to the business official email box to which the employee account corresponds. The reason that the instant embodiment selects the business official email box as a transmission channel for the log-in verification code is that the business official email box is closely associated with the business employee, and the employee, when on the job, always uses the business official email box, making receiving the verification code easy; and when the employee leaves the job, management staffs cancel the official email box of the resigned employee, so that the resigned employee may not receive the log-in verification code transmitted from the service platform, making it impossible to proceed with verification, and thus impossible to log in the service platform.

S3, the service platform receiving a verification code that the business employee inputs in the log-in interface, and determining whether the verification code is the log-in verification code or not. If the business official email box of the employee is still active, then the log-in verification code transmitted from the service platform can be received, and the employee, after checking up the log-in verification code in the business official email box, inputs the log-in verification code to the log-in interface. If the employee has already left the job, the business official email box used thereby has been canceled, and it is not possible to receive the log-in verification code and the verification code so inputted under this condition may be just randomly inputted. The smart terminal uploads the verification code received thereby to the service platform, and the service platform determines whether the verification code is the log-in verification code or not.

S4, if the verification code is the log-in verification code, then the employee account successfully logs in the service platform. If the verification code is not the log-in verification code, then the employee account may not log in the service platform.

The instant embodiment uses the association between the business employee and the business official email box in order to verify the identity of the business employee by means of the business official email box, and effectively prevent a resigned employee from logging in the service platform to improve the security of the platform.

Figure 2:
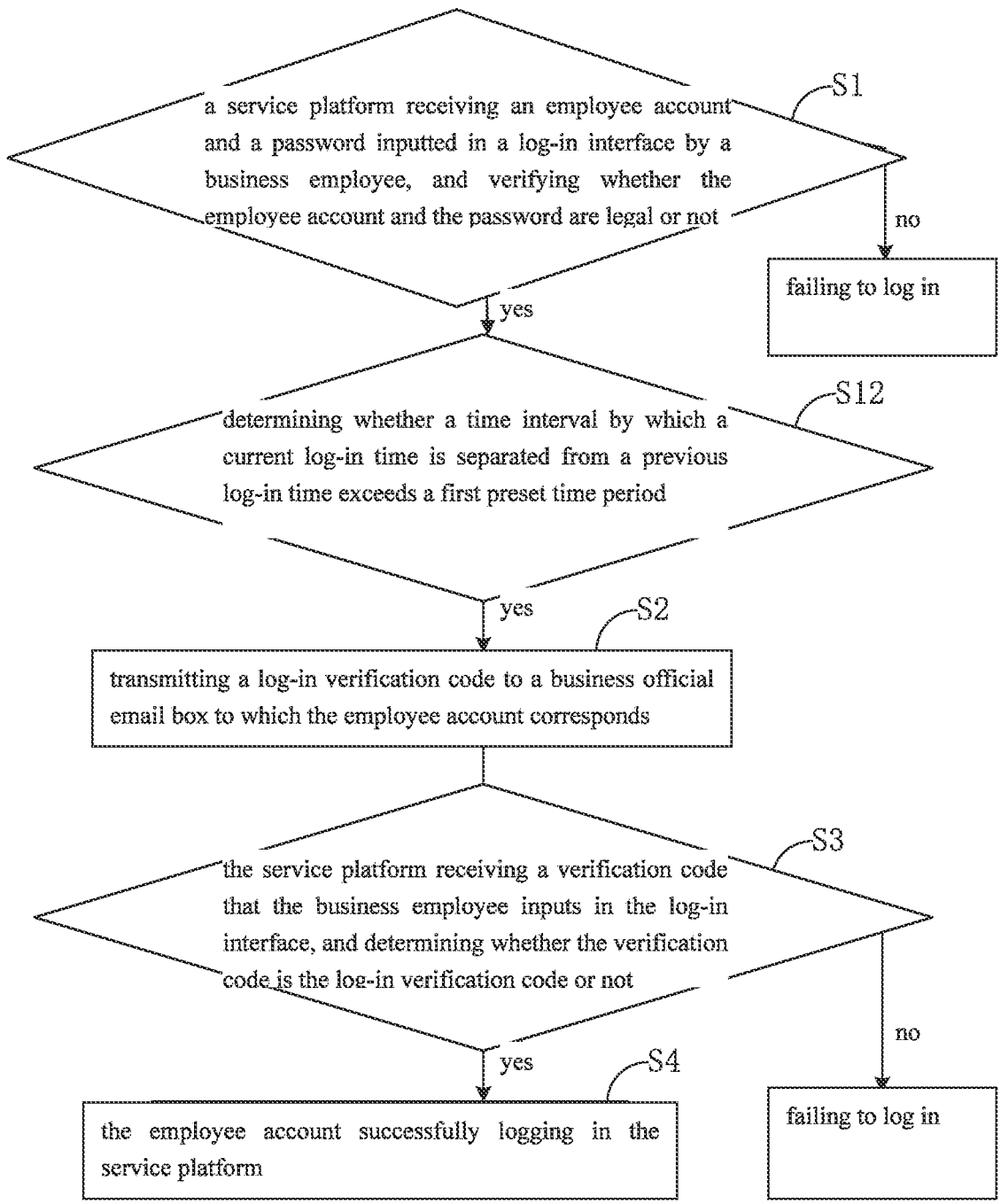
FIG. 2 is a flow chart illustrating a business official email box based B2B service security verification method provided according to an embodiment.

Referring to FIG. 2, in a preferred embodiment, a business official email box based B2B service security verification method of the instant embodiment comprises the following steps:

S1, a service platform receiving an employee account and a password inputted in a log-in interface by a business employee, and verifying whether the employee account and the password are legal or not. The service platform in the instant embodiment is a platform that provides B2B service, and the service platform is executable in a server or a cloud. The service platform stores the employee account and the password registered by the business employee. The business employee may use a smart terminal, such as a computer and a smart phone, to log in the service platform. After the business employee inputs the employee account and the password in the log-in interface of the smart terminal, the smart terminal uploads the employee account and the password to the service platform, and the service platform carries out legality verification.

S12, if the employee account and the password are legal, determining whether a time interval by which a current log-in time is separated from a previous log-in time exceeds a first preset time period. If the employee, after successfully logging in last time, logs in in a short period of time, then the probability that the employee has left the job is quite low, and there is no need to proceed with complicated verification. The service platform records the log-in times of each employee account, and with the employee account and the password being legal, the service platform reads the time when the employee account successfully logged in last time and determines if the time interval by which the current log-in time is separated from the previous log-in time exceeds the first preset time period. Optionally, the first preset time period may be set as desired, such as 8 hours for the employee on duty, or 12 hours, or 24 hours.

S2, if the time interval by which the current log-in time is separated from the previous log-in time exceeds the first preset time period, then the employee possibly left the job already, the service platform necessarily transmitting the log-in verification code to the business official email box to which the employee account corresponds. If the employee account and the password uploaded through the smart terminal match up with the employee account and the password stored in the service platform, the user account is verified to be legal. If the employee account and the password uploaded through the smart terminal do not match up with the employee account and the password stored in the service platform, then the user account is verified to be illegal. The service platform requires each employee account be bonded to a business official email box of a business associated therewith. After the employee account and the password are verified to be legal, the service platform transmits the log-in verification code to the business official email box to which the employee account corresponds. The reason that the instant embodiment selects the business official email box as a transmission channel for the log-in verification code is that the business official email box is closely associated with the business employee, and the employee, when on the job, always uses the business official email box, making receiving the verification code easy; and when the employee leaves the job, management staffs cancel the official email box of the resigned employee, so that the resigned employee may not receive the log-in verification code transmitted from the service platform, making it impossible to proceed with verification, and thus impossible to log in the service platform.

S3, the service platform receiving a verification code that the business employee inputs in the log-in interface, and determining whether the verification code is the log-in verification code or not. If the business official email box of the employee is still active, then the log-in verification code transmitted from the service platform can be received, and the employee, after checking up the log-in verification code in the business official email box, inputs the log-in verification code to the log-in interface. If the employee has already left the job, the business official email box used thereby has been canceled, and it is not possible to receive the log-in verification code and the verification code so inputted under this condition may be just randomly inputted. The smart terminal uploads the verification code received thereby to the service platform, and the service platform determines whether the verification code is the log-in verification code or not.

S4, if the verification code is the log-in verification code, then the employee account successfully logs in the service platform. If the verification code is not the log-in verification code, then the employee account may not log in the service platform.

The instant embodiment uses the association between the business employee and the business official email box in order to verify the identity of the business employee by means of the business official email box, and effectively prevent a resigned employee from logging in the service platform to improve the security of the platform.

In some embodiments, determining whether the verification code is the log-in verification code or not performed in Step S3 of the business official email box based B2B service security verification method comprises: determining whether the verification code is received in a second preset time period after transmitting the log-in verification code, and if the verification code is received in the second preset time period after transmitting the log-in verification code, determining if the verification code is the log-in verification code; and if the verification code is not received in the second preset time period after transmitting the log-in verification code, failing the log-in. Optionally, the second preset time period has a relatively short time period so as to ensure the user may receive the email and input the log-in verification code, such as 30 seconds, 1 minute, and 2 minutes, which can be set as desired by the user.

Figure 3:
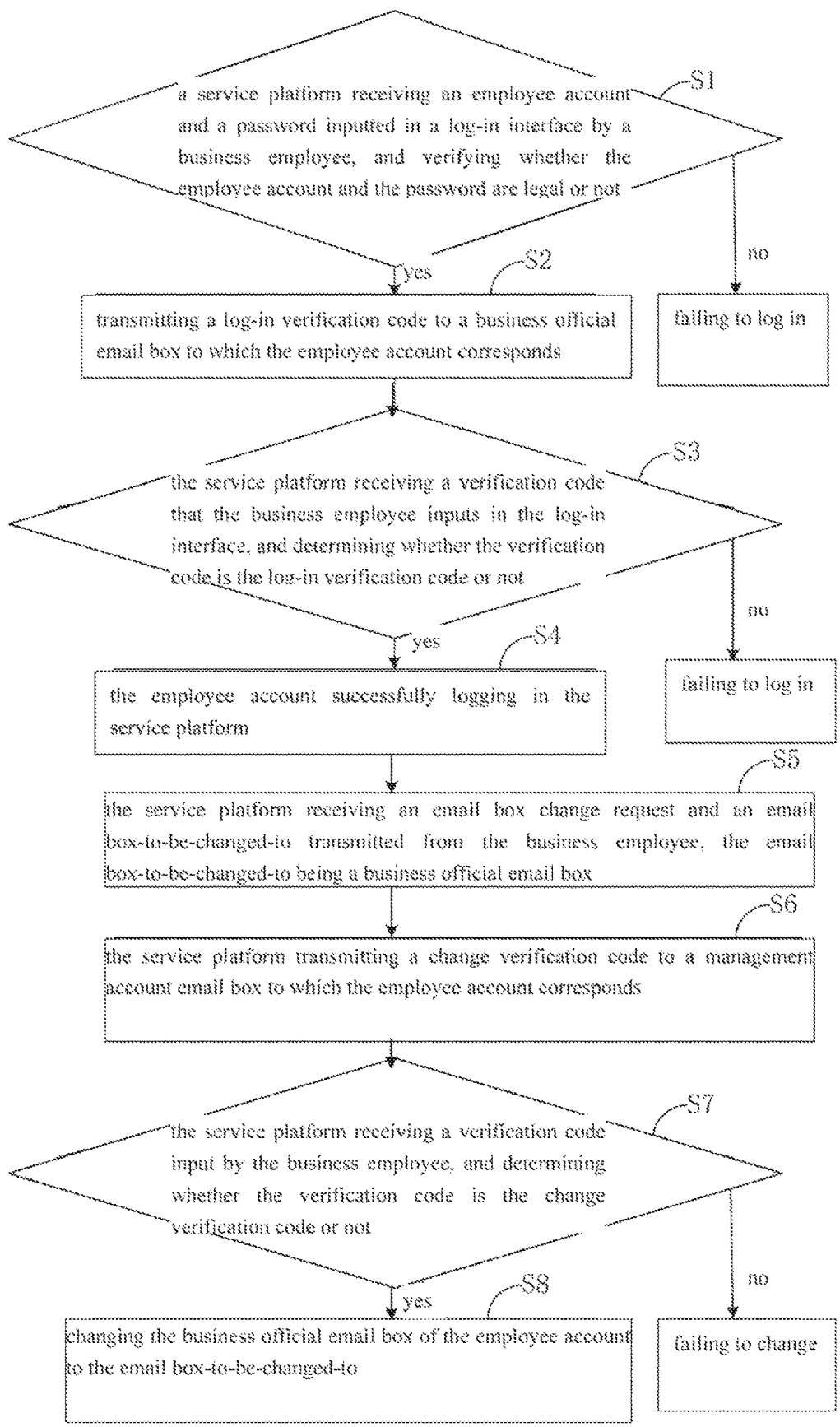
FIG. 3 is a flow chart illustrating a business official email box based B2B service security verification method provided according to an embodiment.

Referring to FIG. 3, in another preferred embodiment, a business official email box based B2B service security verification method of the instant embodiment comprises the following steps:

S1, a service platform receiving an employee account and a password inputted in a log-in interface by a business employee, and verifying whether the employee account and the password are legal or not. The service platform in the instant embodiment is a platform that provides B2B service, and the service platform is executable in a server or a cloud. The service platform stores the employee account and the password registered by the business employee. The business employee may use a smart terminal, such as a computer and a smart phone, to log in the service platform. After the business employee inputs the employee account and the password in the log-in interface of the smart terminal, the smart terminal uploads the employee account and the password to the service platform, and the service platform carries out legality verification.

S2, if the employee account and the password are legal, transmitting a log-in verification code to a business official email box to which the employee account corresponds. If the employee account and the password uploaded through the smart terminal match up with the employee account and the password stored in the service platform, the user account is verified to be legal. If the employee account and the password uploaded through the smart terminal do not match up with the employee account and the password stored in the service platform, then the user account is verified to be illegal. The service platform requires each employee account be bonded to a business official email box of a business associated therewith. After the employee account and the password are verified to be legal, the service platform transmits the log-in verification code to the business official email box to which the employee account corresponds. The reason that the instant embodiment selects the business official email box as a transmission channel for the log-in verification code is that the business official email box is closely associated with the business employee, and the employee, when on the job, always uses the business official email box, making receiving the verification code easy; and when the employee leaves the job, management staffs cancel the official email box of the resigned employee, so that the resigned employee may not receive the log-in verification code transmitted from the service platform, making it impossible to proceed with verification, and thus impossible to log in the service platform.

S3, the service platform receiving a verification code that the business employee inputs in the log-in interface, and determining whether the verification code is the log-in verification code or not. If the business official email box of the employee is still active, then the log-in verification code transmitted from the service platform can be received, and the employee, after checking up the log-in verification code in the business official email box, inputs the log-in verification code to the log-in interface. If the employee has already left the job, the business official email box used thereby has been canceled, and it is not possible to receive the log-in verification code and the verification code so inputted under this condition may be just randomly inputted. The smart terminal uploads the verification code received thereby to the service platform, and the service platform determines whether the verification code is the log-in verification code or not.

S4, if the verification code is the log-in verification code, then the employee account successfully logs in the service platform. If the verification code is not the log-in verification code, then the employee account may not log in the service platform.

S5, the service platform receiving an email box change request and an email box-to-be-changed-to transmitting from the business employee, the email box-to-be-changed-to being a business official email box. The employee, when attempting to change the business official email box that is already bonded to the service platform, must first successfully log in the service platform. After successfully logging in, filling in the email box change request and the email box-to-be-changed-to in the smart terminal, and the smart terminal uploading the email box change request and the email box-to-be-changed-to to the service platform.

Optionally, to make sure the email box-to-be-changed-to is a business official email box, the service platform in the instant embodiment, after receiving the email box-to-be-changed-to, executing Step S56, the service platform verifying whether a business name marking location of the email box-to-be-changed-to is the business name marking of the business to which the employee account belongs or not, where the service platform stores the business name marking for each business, in which the business name marking location refers to a text segment of an email box that marks the business name, such as a suffix or a text segment of a middle portion of the email box. Through the verification, if the business name marking location of the email box-to-be-changed-to is the business name marking of the business to which the employee account belongs, executing Step S6; if the business name marking location of the email box-to-be-changed-to is not the business name marking of the business to which the employee account belongs, failing the email box change.

S6, the service platform transmitting a change verification code to a management account email box to which the employee account corresponds. To avoid email box change made by the employee privately, which leads subsequent incapability of management, the instant embodiment requires change of the business official email box by the employee must be acknowledged and approved by a management staff. Therefore, the service platform, after receiving the email box change request and the email box-to-be-changed-to transmitted from the business employee, transmits the change verification code to the management account email box to which the employee account corresponds. At time moment, the employee must ask for the change verification code from the management staff, in order to ensure that the management staff is aware of the event of email box change. The management staff, if approving the change, notifies the employee the change verification code, and the employee may input the change verification code in a change page. Optionally, to allow the management staff to learn more information related thereto, the service platform transmits information related to the change verification code and the employee account to the management account email box to which the employee account corresponds, wherein the related information includes name, title/position, privilege, application time, and log-in time of the employee.

S7, the service platform receiving a verification code input by the business employee, and determining whether the verification code is the change verification code or not. After the employee inputs the change verification code in the change page, the smart terminal uploads the change verification code to the service platform for verification. Since it is possible that the employee makes the change privately, it is useful to carry out verification for the verification code inputted thereby, meaning the service platform receives the verification code inputted by the business employee and determines whether the verification code is the change verification code or not.

S8, if the verification code is the change verification code, changing the business official email box of the employee account to the email box-to-be-changed-to. If the verification code is not the change verification code, failing the change.

The instant embodiment uses the association between the business employee and the business official email box in order to verify the identity of the business employee by means of the business official email box, and effectively prevent a resigned employee from logging in the service platform to improve the security of the platform. Further, when the employee needs to change the business official email box, the change verification code is transmitted to the management staff and the employee is required to ask for the verification code from the management staff so as to ensure the management staff is aware of the event of change and is potent to approve the employee to make the change to thereby improving the platform security.

In some embodiments, in the business official email box based B2B service security verification method, determining whether the verification code is the change verification code or not performed in Step S7 comprises: determining whether the verification code is received in a third preset time period after transmitting the change verification code, and if the verification code is received in the third preset time period after transmitting the change verification code, determining whether the verification code is the change verification code or not; if the verification code is not received in the third preset time period after transmitting the change verification code, then failing the change. Optionally, the third preset time period has a relatively short time period so as to ensure the user may receive the email and input the change verification code, such as 30 seconds, 1 minute, and 2 minutes, which can be set as desired by the user.

In some embodiments, the business official email box based B2B service security verification method may further comprise: S9, the service platform recording all historical operation information of the employee account, in order to allow the management staff to subsequently check up details of changes made by each employee to improve efficiency of management.

In a preferred embodiment, a business official email box based B2B service security verification apparatus comprises:

a first verification unit, which is configured for a service platform to receive an employee account and a password inputted in a log-in interface by a business employee, and verifying whether the employee account and the password are legal or not. The service platform in the instant embodiment is a platform that provides B2B service, and the service platform is executable in a server or a cloud. The service platform stores the employee account and the password registered by the business employee. The business employee may use a smart terminal, such as a computer and a smart phone, to log in the service platform. After the business employee inputs the employee account and the password in the log-in interface of the smart terminal, the smart terminal uploads the employee account and the password to the service platform, and the service platform carries out legality verification.

a transmission unit, which is configured for transmitting a log-in verification code to a business official email box to which the employee account corresponds if the employee account and the password are legal. If the employee account and the password uploaded through the smart terminal match up with the employee account and the password stored in the service platform, the user account is verified to be legal. If the employee account and the password uploaded through the smart terminal do not match up with the employee account and the password stored in the service platform, then the user account is verified to be illegal. The service platform requires each employee account be bonded to a business official email box of a business associated therewith. After the employee account and the password are verified to be legal, the service platform transmits the log-in verification code to the business official email box to which the employee account corresponds. The reason that the instant embodiment selects the business official email box as a transmission channel for the log-in verification code is that the business official email box is closely associated with the business employee, and the employee, when on the job, always uses the business official email box, making receiving the verification code easy; and when the employee leaves the job, management staffs cancel the official email box of the resigned employee, so that the resigned employee may not receive the log-in verification code transmitted from the service platform, making it impossible to proceed with verification, and thus impossible to log in the service platform.

a second verification unit, which is configured for the service platform to receive a verification code that the business employee inputs in the log-in interface, and determining whether the verification code is the log-in verification code or not. If the business official email box of the employee is still active, then the log-in verification code transmitted from the service platform can be received, and the employee, after checking up the log-in verification code in the business official email box, inputs the log-in verification code to the log-in interface. If the employee has already left the job, the business official email box used thereby has been canceled, and it is not possible to receive the log-in verification code and the verification code so inputted under this condition may be just randomly inputted. The smart terminal uploads the verification code received thereby to the service platform, and the service platform determines whether the verification code is the log-in verification code or not.

a log-in unit, which functions such that if the verification code is the log-in verification code, then the employee account successfully logs in the service platform. If the verification code is not the log-in verification code, then the employee account may not log in the service platform.

The instant embodiment uses the association between the business employee and the business official email box in order to verify the identity of the business employee by means of the business official email box, and effectively prevent a resigned employee from logging in the service platform to improve the security of the platform.

Figure 4:
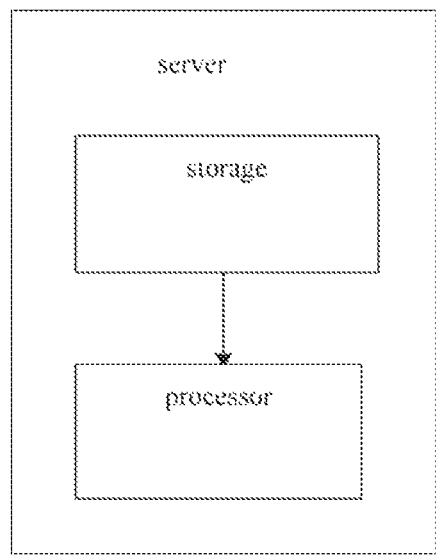
FIG. 4 is a schematic view illustrating a structure of a server provided according to an embodiment.

A preferred embodiment provides a server, referring to FIG. 4, and the server comprises a storage and a processor. The storage is configured to store a computer program; and the processor is configured to execute the computer program stored in the storage in order to perform the business official email box based B2B service security verification method described above.

A progressive way is adopted to illustrate various embodiments of the disclosure. The description of each embodiment focuses on key features that are different from those of other embodiments. Similar parts of the various embodiments may refer to each other. For the devices disclosed in the embodiments, since they are corresponding to the methods disclosed in the embodiments, and the descriptions thereof are relatively simplified, and the related parts may refer to the descriptions of the methods.

Skilled artisans may further notice that the units and method steps of each example of the embodiments disclosed in this disclosure can be implemented in hardware or computer software or a combination of the two. To clearly illustrate the exchangeability of hardware and software, the illustration provided above demonstrates the components and steps of each example with a general description according to functions thereof. Whether such functions can be implemented with hardware or software is determined by the specific application and design requirement conditions of the technical solution. Skilled artisans may adopt different ways to implement the functions so described for each specific application, and such implementations should not be regarded as exceeding the scope of the present invention.

The steps of the method or algorithm described with reference to the embodiments disclosed in the disclosure can be implemented directly by means of hardware, or by means of software modules executable in a processor, or a combination of the two. The software modules may be loaded in a random access memory (RAM), an internal storage, a read only memory (ROM), an electrically programmable ROM, an electrically erasable ROM, a register, a hard disc drive, a mobile magnetic drive, a CD-ROM, or any other forms of storage medium known in the field.

The embodiments provided above are only for illustration of the technical thoughts and features of the present invention, for the purposes to help those skilled in the art to understand the contents of the present invention and to accordingly put into practice, and should not be construed as limiting to the scope of protection for the present invention. All variations and modifications that are considered equivalent to the scope of the appended claims of the application belong to the scope of the present invention as defined solely by the appended claims.

What is claimed is:

1. A business official email box based B2B (Business-to-Business) service security verification method, comprising:
    S1, a service platform receiving an employee account and a password inputted in a log-in interface by a business employee, and verifying whether the employee account and the password are legal or not;
    S2, if yes, transmitting a log-in verification code to a business official email box to which the employee account corresponds;
    S3, the service platform receiving a verification code that the business employee inputs in the log-in interface, and determining whether the verification code is the log-in verification code or not;
    S4, if yes, the employee account successfully logging in the service platform;
    S5, the service platform receiving an email box change request and an email box-to-be-changed-to transmitted from the business employee, the email box-to-be-changed-to being a business official email box;
    S6, the service platform transmitting a change verification code to a management account email box to which the employee account corresponds;
    S7, the service platform receiving a verification code input by the business employee, and determining whether the verification code is the change verification code or not; and
    S8, if yes, changing the business official email box of the employee account to the email box-to-be-changed-to.

2. The business official email box based B2B service security verification method according to claim 1, further comprising, after Step S1 and before Step S2:
    S12, if yes, determining whether a time interval by which a current log-in time is separated from a previous log-in time exceeds a first preset time period; and if yes, executing Step S2.

3. The business official email box based B2B service security verification method according to claim 1, wherein determining whether the verification code is the log-in verification code or not performed in Step S3 comprises:
    determining whether the verification code is received in a second preset time period after transmitting the log-in verification code, and if yes, determining if the verification code is the log-in verification code.

4. The business official email box based B2B service security verification method according to claim 1, wherein determining whether the verification code is the log-in verification code or not performed in Step S3 comprises:
    determining whether the verification code is received in a second preset time period after transmitting the log-in verification code, and if no, failing to log in the service platform.

5. The business official email box based B2B service security verification method according to claim 1, further comprising, after Step S5 and before Step S6:
    S56, the service platform verifying whether a business name marking location of the email box-to-be-changed-to is a business name marking of the business to which the employee account belongs or not, and if yes, executing Step S6.

6. The business official email box based B2B service security verification method according to claim 1, wherein Step S6 comprises:
    the service platform transmitting the change verification code and information related to the employee account to the management account email box to which the employee account corresponds.

7. The business official email box based B2B service security verification method according to claim 1, wherein determining whether the verification code is the change verification code or not performed in Step S7 comprises:
    determining whether the verification code is received in a third preset time period after transmitting the change verification code, and if yes, determining whether the verification code is the change verification code or not.

8. The business official email box based B2B service security verification method according to claim 1, further comprising:
    the service platform recording all historical operation information of the employee account.

9. A server comprising a storage and a processor;
    the storage being configured for storing a computer program; and
    the processor being configured for executing the computer program stored in the storage in order to perform the business official email box based B2B service security verification method according to claim 1.

* * * * *